(12) United States Patent
Chatron-Michaud et al.

(10) Patent No.: US 9,512,319 B2
(45) Date of Patent: Dec. 6, 2016

(54) PROCESS FOR THE PRODUCTION OF CARBON BLACK FROM AT LEAST ONE FCC SLURRY CUT, COMPRISING A SPECIFIC HYDROTREATMENT

(71) Applicant: IFP ENERGIES NOUVELLES, Rueil-Malmaison (FR)

(72) Inventors: Pascal Chatron-Michaud, Lyons (FR); Jerome Majcher, Lyons (FR); Frederic Morel, Chatou (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 192 days.

(21) Appl. No.: 14/554,271

(22) Filed: Nov. 26, 2014

(65) Prior Publication Data
US 2015/0147264 A1    May 28, 2015

(30) Foreign Application Priority Data

Nov. 27, 2013  (FR) .................................... 13 61.691
Nov. 27, 2013  (FR) .................................... 13 61.692

(51) Int. Cl.
| C09C 1/48 | (2006.01) |
| C09C 1/54 | (2006.01) |
| C01B 31/02 | (2006.01) |
| C09C 1/50 | (2006.01) |
| C09C 1/52 | (2006.01) |

(52) U.S. Cl.
CPC ................ C09C 1/54 (2013.01); C01B 31/02 (2013.01); C09C 1/48 (2013.01); *C01P 2006/10* (2013.01)

(58) Field of Classification Search
CPC ................ C09C 1/48; C09C 1/50; C09C 1/52; C09C 1/54; C01B 31/02
See application file for complete search history.

(56) References Cited

U.S. PATENT DOCUMENTS

| 3,617,474 A * | 11/1971 | Stotler .................. C10G 1/083 208/409 |
| 3,642,608 A | 2/1972 | Roach et al. |
| 4,430,198 A * | 2/1984 | Heck ...................... C10G 45/08 208/112 |
| 5,069,775 A | 12/1991 | Grosboll |
| 5,427,762 A | 6/1995 | Steinberg et al. |
| 2007/0138058 A1 | 6/2007 | Farshid et al. |
| 2011/0049010 A1 | 3/2011 | Abdel-Halim et al. |
| 2011/0120908 A1 | 5/2011 | Marzin et al. |
| 2012/0234726 A1 | 9/2012 | Morel et al. |
| 2013/0313159 A1* | 11/2013 | Marve ................... C10G 21/14 208/14 |

OTHER PUBLICATIONS

Search Report dated Aug. 19, 2014 issued in corresponding FR 1361691 application (pp. 1-2).
Search Report dated Aug. 19, 2014 issued in corresponding FR 1361692 application (pp. 1-2).

* cited by examiner

*Primary Examiner* — Brian McCaig
(74) *Attorney, Agent, or Firm* — Millen White Zelano and Branigan, PC; Csaba Henter; Anthony Zelano

(57) ABSTRACT

The present invention describes a process for the production of carbon black starting from a 360+ cut known as a slurry cut obtained from a FCC or RFCC unit, to which a vacuum residue type cut may be added, said process using a specific hydrotreatment unit.

6 Claims, 1 Drawing Sheet

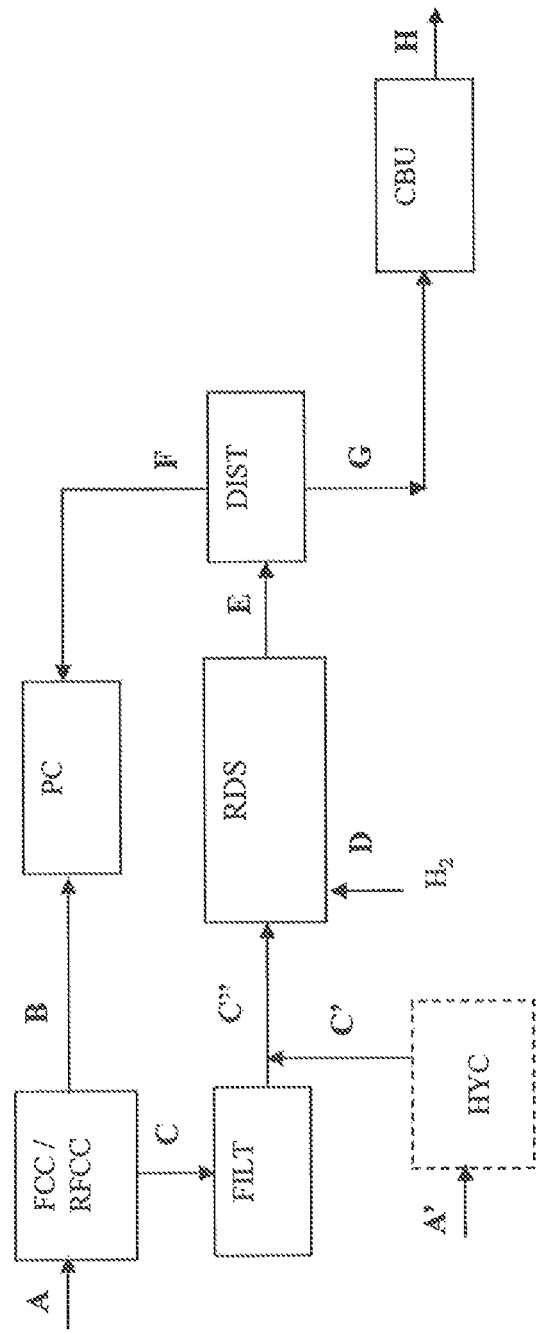

PROCESS FOR THE PRODUCTION OF CARBON BLACK FROM AT LEAST ONE FCC SLURRY CUT, COMPRISING A SPECIFIC HYDROTREATMENT

FIELD OF THE INVENTION

The present invention relates to the field of processes for the production of carbon black and uses the "slurry" cut obtained from a catalytic cracking unit (hereinafter denoted FCC) or from a residue cracking unit (hereinafter denoted RFCC) as the feed. In the remainder of the text, for simplification, when a catalytic cracking unit is mentioned, it may be either a conventional heavy cut cracking unit (vacuum distillates) or a residue catalytic cracking unit.

In the field of oil refining, a fluidized bed catalytic cracking unit, hereinafter denoted FCC, is generally used to convert heavy oil cuts which may or may not have been hydrotreated (for example a hydrotreated vacuum distillate or hydrotreated residue) into oil cuts which can be upgraded such as propylene, gasoline, liquefied petroleum gas, LPG, or "light cycle oil" (LCO) type oils which result in diesel.

A highly aromatic residue is left in the bottom of the catalytic cracking unit which is generally known as "slurry". This cut has a distillation start point which is generally around 360° C.

The skilled person often uses the term 360+ cut; this definition will be that used in the context of the present invention.

This slurry cut also contains catalyst fines which are formed by wear inside the catalytic cracking unit.

This slurry is generally difficult to upgrade and is often burned as a fuel. The term "slurry" does not translate readily into the French language; thus, since it is a term which is well known to the skilled person, we have used it throughout the present application in French.

Unexpectedly, the Applicant has discovered that it is of advantage to use this highly aromatic residue known as a "slurry", obtained as an effluent from catalytic cracking (RFCC or FCC), as a feed for a unit for the hydrotreatment of residues (RDS, for "Resid Desulphurization Unit") by adjusting the operating conditions so as to maximize the hydrodesulphurization (HDS) reactions and simultaneously to minimize the hydrodearomatization (HDA) reactions so as to maintain a high degree of aromaticity.

The highly aromatic effluent leaving the hydrotreatment unit (RDS) may then be sent to a specialized unit in order to make carbon black (hereinafter termed CBU, carbon black unit).

Carbon black is a commercial product which may be used as a pigment or in the manufacture of Indian ink type inks, but also acts as a feed in the manufacture of certain materials (in particular rubber for tyres), and in certain paints, varnishes, lacquers, plastics, fibres, ceramics and enamels. It has been very widely used in the past as carbon paper and black ribbons for typewriters, and now in black electrostatic powder for photocopiers[3].

Carbon black is also used in the laboratory in order to increase the melting point of certain products in solution. It is frequently used as an adsorbent material in purification operations, for example for heavy polyaromatics, or to remove dissolved coloured impurities and to fix the material in suspension, thereby forming aggregates of impurities, which are easy to separate by filtration[11].

Carbon black is also used as a food colorant (E152)[12].

Carbon black is listed in the European Inventory of Existing Commercial Chemical Substances (EINECS) with number 215-609-9. It is classified into several grades in accordance with the ASTM standard which are given in the "detailed description" paragraph.

The process of the present invention can be used to obtain any of the grades of the ASTM classification for carbon black known as "furnace black carbon".

EXAMINATION OF THE PRIOR ART

The following prior art documents dealing with the production of carbon black can be cited:

The article "Upgrade FCC "slurry" oil with chemical settling aids" by W.F. Minyard in the review: World Refining, Jan. 1, 1999 (Volume: 9, pages 35-38).

That article provides a study of the impact of catalyst fines in the RFCC slurry comprising a comparison between a cyclone type separator and a separator employing settling by means of a chemical flocculating agent. That article mentions the advantage of providing a highly aromatic slurry oil (obtained by very intense RFCC conversion) in order to obtain carbon black oil (hereinafter denoted CBO), needle coke, a feed for a hydrocracker, or as a component of a commercial heavy fuel.

The article:"Research progress in purification of FCC "slurry" oil and its application to chemical industry" by Bingcheng Cao published in the review Petrochemical Technology, Jan. 1, 2012 (volume 41, pages 364-369) describes the purification of RFCC slurry to produce CBO, or needle coke.

The purifications cited are principally intended to remove catalyst fines: filtration, electrostatic separation, separation by centrifuging, separation by ceramic membrane.

Patent EP 2471895 A1 describes the use of a zeolitic type catalyst not charged with metals in order to carry out selective hydrocracking of low aromaticity molecules with low molecular weights.

The heavy, aromatic portion is separated from the light portion by distillation.

U.S. Pat. No. 4,267,033 describes a hydrotreatment (HDS, HDN, HDCCR) of slurry and highly aromatic liquefied coal products with conventional commercial catalysts, generally of the NiMo type.

Patent US 2012/0246999 A1 details a manner of complying with new fuel specifications anticipated for 2015 in zones termed emission control areas, ECA (principal specification: 0.1% S) and anticipated for 2020-2025 for the remaining seas (principal specification: 0.5% S).

The idea developed in this text is to use mainly residual fractions (cheaper) instead of distillate fractions.

Distillates are currently the only cuts which have been identified as being capable of complying with the level of 0.1% S. The 0.5% S level can be obtained directly from residues by intense hydrodesulphurization or by mixing with distillates. The cited patent describes the use of hydrotreated VGO (the abbreviation for vacuum gas oil, obtained from the vacuum distillation of an atmospheric residue).

Thus, it is a residual fraction which is a little cracked by passage through HDT, but is considerably desulphurized and mixed with other, heavier, fractions to match it to the specification: atmospheric residue, visbreaker residue, DAO vacuum residue, slurry, HCO.

BRIEF DESCRIPTION OF THE FIGURE

FIG. 1 represents a layout of the process of the invention in which (FCC or RFCC) denotes the catalytic cracking unit supplied with a feed (A) and producing a slurry cut (C);

(FILT) denotes the unit for filtering the slurry cut (C), producing a clarified slurry cut; (RDS) denotes the hydrotreatment unit which processes either the clarified slurry cut or the mixture of said "clarified slurry" cut and the hydrotreated vacuum residue cut (C'); (DIST) denotes the distillation unit placed downstream of the hydrotreatment unit (RDS); and (CBU) denotes the unit for the production of carbon black which produces said carbon black (H).

The dotted lines, clearly indicating that it is optional, indicate the hydrotreatment unit (HYC) which processes the optional vacuum residue feed A' the hydrotreated effluent from which, C', may be treated as a mixture with the clarified slurry C" in the hydrotreatment unit (RDS).

The slurry feed (denoted C) obtained from the FCC or RFCC unit is introduced into the clarification unit (FILT) so as to eliminate the majority of the particles with a size of less than 20 microns which are contained in the slurry cut. The resulting clarified slurry feed has a fine particles content of less than 300 ppm, and preferably less than 100 ppm of fine particles.

The clarified feed may be mixed with one of the following feeds (denoted C'):
- a vacuum residue obtained from the vacuum distillation column, preferably hydrotreated in a hydrotreatment unit (HYC),
- an atmospheric residue obtained from the atmospheric distillation column, preferably hydrotreated if necessary,
- a vacuum distillate obtained from the vacuum distillation column, preferably hydrotreated if necessary.

The feed produced thereby, after mixing, has a BMCI of more than 130 before hydrotreatment, and preferably more than 135.

The feed resulting from mixing (C and C', denoted C"), is introduced into the hydrotreatment unit (RDS) which operates under the following conditions:
- a pressure in the range 50 to 200 bars, and preferably in the range 80 to 120 bar;
- a temperature in the range 300° C. to 420° C., preferably in the range 340° C. to 390° C.;
- an HSV in the range 0.1 to 2.5 $h^{-1}$, preferably in the range 0.4 to 1.0 $h^{-1}$;
- the catalyst used being a succession of at least two distinct hydrotreatment catalysts, and said hydrotreatment step producing an effluent with a BMCI value of more than 110.

The effluent from the hydrotreatment unit (RDS) is introduced into a distillation column (DIST) which can be used to separate:
- a "light" portion (denoted F) used as a cut in the fuel pool (FP) which is also constituted by the cracked gasoline obtained from the FCC or RFCC unit (denoted B); and
- a distillation residue (denoted G), with a sulphur content of less than 0.3% and preferably less than 0.1%, and having a BMCI more than 80, preferably more than 100, and a density of more than 0.97 $g \cdot cm^{-3}$, preferably more than 1.0 $g \cdot cm^{-3}$.

The distillation residue (G) is introduced into the carbon black unit (CBU) from which the final product is extracted, i.e. carbon black, with a specification complying with the ASTM standard (grade 110 to 990).

DESCRIPTION OF THE INVENTION

The present invention describes a process for the production of carbon black starting from at least one FCC slurry feed, the abbreviation "FCC" denoting both a conventional catalytic cracking unit as well as a residue catalytic cracking unit.

The slurry cut is defined as the cut with a distillation range starting at 360° C. and denoted 360+. This cut contains fine particles of the catalyst used in the catalytic cracking unit (FCC or RFCC).

In some cases, this cut has to be freed from its fine solid particles in a filtration unit which will not be described here in detail as it is comprised in the prior art. The aim of this filtration unit is to achieve a fines content of less than 300 ppm, and preferably less than 100 ppm.

In the context of the present invention, it is possible to add a second feed to the slurry feed, which former is preferably a hydrotreated vacuum residue (RSV), said hydrotreated vacuum residue being mixed with the clarified slurry feed upstream of the hydrotreatment unit (RDS).

When, in addition to the slurry feed, the present process uses a second vacuum residue feed (RSV), the step (HYC) for hydrotreatment of said vacuum residue feed (RSV) is carried out in an ebullated bed hydrotreatment unit (HYC) operating under the following conditions:
- a pressure in the range 50 to 250 bars, and preferably in the range 60 to 200 bar;
- a temperature in the range 300° C. to 550° C., preferably in the range 350° C. to 500° C.;
- an HSV in the range 0.1 to 10 $h^{-1}$, preferably in the range 0.15 to 5.0 $h^{-1}$.

The catalysts from the vacuum residue hydrotreatment unit (HYC) are selected from catalysts comprising an alumina support and at least one metal from group VIII selected from nickel and cobalt, said element from group VIII being used in association with at least one metal from group VIB selected from molybdenum and tungsten.

The slurry cut, preferably freed from its fine particles, termed the clarified slurry, is sent to a hydrotreatment unit, denoted (RDS), which generally operates under the following conditions:
- a pressure in the range 50 to 200 bars;
- a temperature in the range 300° C. to 420° C.;
- an HSV in the range 0.1 to 2.5 $h^{-1}$;

The catalyst used is a hydrotreatment "catalyst concatenation" in the sense that the hydrotreatment unit (RDS) of the present invention comprises at least two distinct beds of hydrotreatment catalyst.

The catalyst for the first bed is a hydrodemetallization catalyst, for example of the type: HF 858 sold by AXENS.

The catalyst for the second bed is a hydrodesulphurization catalyst, for example of the type: HT 438 sold by AXENS.

Preferably, in the context of the present invention, the operating conditions for the hydrotreatment unit (RDS) are as follows:
- a pressure preferably in the range 80 to 120 bar;
- a temperature preferably in the range 340° C. to 390° C.;
- an HSV preferably in the range 0.4 to 1.0 $h^{-1}$.

In a preferred variation of the carbon black production process of the present invention, the two catalysts used in the hydrotreatment unit (RDS) are, in succession (i.e. in the direction of the flow of the feed to be treated):
- a catalyst primarily ensuring hydrodemetallization (denoted HDM);
- a catalyst primarily ensuring hydrodesulphurization (denoted HDS), the volumetric ratio of the HDM catalyst to the HDS catalyst being in the range 0.05 to 1, preferably in the range 0.1 to 0.5.

In another variation of the process of the present invention, a feed selected from the following is added to the clarified slurry feed upstream of the hydrotreatment unit (RDS):
- a vacuum residue obtained from the vacuum distillation column, preferably not hydrotreated,
- an atmospheric residue obtained from the atmospheric distillation column, preferably not hydrotreated,
- a vacuum distillate obtained from the vacuum distillation column, preferably not hydrotreated.

The feed thus produced after mixing has a BMCI of more than 130 before hydrotreatment, preferably more than 135.

In some cases, it is possible to add a certain quantity of 360+ fraction obtained from the liquefaction of coal or a feed known as "steam cracking tar", which is a residual fuel obtained from a steam cracking unit, to the principal clarified slurry feed.

The hydrotreated effluent leaving the RDS unit is then distilled in a distillation column (DIST). The 360+ cut is sent to a carbon black unit (CBU), and the 360− cut is added to the refinery fuel pool. The 360+ cut point may optionally be adjusted to another temperature to obtain a BMCI>110.

The BMCI(Bureau of Mines Correlation Index) is defined by the following formula, in which the abbreviation VABP designates the mean "volumetric" temperature expressed in degrees Rankine and the abbreviation "Sp. Gr" designates the density:

$$BMCI = \frac{87552}{VABP(°R)} + 473.7 \times Sp \cdot Gr. - 456.8$$

The feed thus undergoes a thermo-oxidation reaction (pyrolysis and decomposition of the feed in a gas saturated with $CO_2$) which is stopped by cooling with water.

The particles of carbon black are then filtered from the cooling water and the remaining tail gas is treated at the outlet from the unit.

The more aromatic the feed sent to the carbon black unit (CBU), the higher will be the yield of carbon black.

The carbon black unit (CBU) will not be described in detail in the present application as a description can be found, for example, in the document IARC Monographs (Volume 93, p 56-59).

The incomplete combustion of tar type hydrocarbons or aromatic oil type hydrocarbons (the slurry cut is part of this) produces a carbon black which has the name "furnace black", which represents 95% of global production (see Table I at the end of the present paragraph).

The first step consists of atomizing the preheated feed using any atomization means which is known to the skilled person.

The second step consists of burning the atomized feed with a lack of oxidant in the combustion gas, the temperature generally being fixed between 1400° C. and 1800° C.

The carbon black is produced in the form of a suspension of solid particles in the gas, the size of the particles formed possibly being from 20 to 300 microns, depending on the operating conditions for the carbon black unit.

The suspension of solid particles in the gas is abruptly cooled with water and passed over bag filters to separate the gases (Sox, Nox, H2O) from the particles. A drying operation is carried out, followed by packaging.

Table I below provides the principal categories of carbon black with references N110 to N990.

The present process can be used to produce any desired category of carbon black, corresponding to the ASTM standard in accordance with Table A below.

TABLE A

| Complete designation | Abbrev. | ASTM standard | Particle size nm | Tensile strength MPa | Relative laboratory abrasion | Relative road-wear abrasion |
|---|---|---|---|---|---|---|
| Super Abrasion Furnace | SAF | N110 | 20-25 | 25.2 | 1.35 | 1.25 |
| Intermediate SAF | ISAF | N220 | 24-33 | 23.1 | 1.25 | 1.15 |
| High Abrasion Furnace | HAF | N330 | 28-36 | 22.4 | 1.00 | 1.00 |
| Easy Processing Channel | EPC | N300 | 30-35 | 21.7 | 0.80 | 0.90 |
| Fast Extruding Furnace | FEF | N550 | 39-55 | 18.2 | 0.64 | 0.72 |
| High Modulus Furnace | HMF | N683 | 49-73 | 16.1 | 0.56 | 0.66 |
| Semi-Reinforcing Furnace | SRF | N770 | 70-96 | 14.7 | 0.48 | 0.60 |
| Fine Thermal | FT | N880 | 180-200 | 12.6 | 0.22 | — |
| Medium Thermal | MT | N990 | 250-350 | 9.8 | 0.18 | |

NB: the various expressions for the different types of carbon black were not translated into French as they are considered to be designations which are known to the skilled person.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 13/61.692, filed Nov. 27, 2013 and FR 13/61.691, filed Nov. 27, 2013 are incorporated by reference herein.

EXAMPLES IN ACCORDANCE WITH THE INVENTION

Examples 1 and 2 are not in accordance with the invention, but can be used to illustrate the advantages of the invention by comparison with Examples 3, 4, 5 and 6, which are in accordance with the invention.

Example 1: not in accordance, with no hydrotreatment unit, RDS, with a VGO type feed sent to a FCC (comparative);

Example 2: not in accordance, with the hydrotreatment unit RDS under unfavourable conditions, with a VGO type feed sent to a FCC (comparative);

Example 3: with the hydrotreatment unit RDS, under favourable operating conditions, with a VGO type feed coupled to a FCC.

Example 4: with the hydrotreatment unit RDS, under favourable operating conditions, with a hydrotreated RSV type feed sent to a RFCC.

Example 5: with the hydrotreatment unit RDS, under favourable operating conditions, with a VGO type feed coupled to a FCC mixed with a vacuum residue (RSV).

Example 6: with RDS under favourable operating conditions, with a hydrotreated VR type feed sent to a RFCC mixed with a vacuum residue (RSV).

The following examples were carried out with a vacuum distillate type hydrocarbon feed (DSV) A deriving from a vacuum distillation unit. This feed originated from an Oural crude oil and was used for the following three examples. Its principal characteristics are given in Table 1 below.

TABLE 1

Characteristics of feed A

| | |
|---|---|
| Density 15/4 | 0.918 |
| Sulphur (wt %) | 1.76 |
| Conradson carbon (%) | 0.4 |
| Viscosity at 100° C. (Cst) | 9 |
| Ni + V (ppm) | <1 |
| Aromatic carbons (%) | 21.8 |

Example 1 (not in Accordance with the Invention)

Use of FCC to Produce a Feed for Supplying to the Carbon Black Unit without Using a RDS Unit Example 1 corresponds to the production of a feed for supplying to the carbon black unit starting from feed A without passing through a hydrotreatment unit (RDS) for residues from this feed after the fluidized bed catalytic cracking unit (Table 2).

TABLE 2

FCC operating conditions

| Catalyst | Silica-alumina |
|---|---|
| C/O | 6.4 |
| ROT (in ° C.) | 540 |
| TRG (in ° C.) | 720 |

The yields for the various cuts obtained from the FCC, expressed as the percentage by weight, are given in Table 3 below.

TABLE 3

Characteristics of cuts obtained from FCC unit

| Yield, dry gases (wt %) | Yield, LPG (wt %) | Yield, Naphta-180 (wt %) | Yield, Kerosene 180-220 (wt %) | Yield, LCO 220-360 (wt %) | Yield, Coke (wt %) | Yield, HCO + slurry 360+ (wt %) |
|---|---|---|---|---|---|---|
| 3.2 | 17.0 | 45.6 | 6.5 | 2.3 | 5.7 | 7.2 |

Table 4 below lists the properties of the slurry type 360+ aromatic residue leaving the FCC, in particular the sulphur content (S, expressed as a percentage by weight), the density at 15° C. (g/cm$^3$) and the aromatic carbon content (AC, expressed as the percentage by weight).

TABLE 4

Characteristics of the 360+ cut obtained from FCC

| | |
|---|---|
| Sulphur (wt %) | 3.70 |
| Aromatic carbon (wt %) | 70 |
| D15/4 (g · cm$^{-3}$) | 1.117 |
| BMCI | 144 |

The 360+ cut obtained was used as the basic feed for the carbon black unit. This feed is denoted C.

This feed C was high in sulphur and had a high aromatic carbons content.

Example 2 (not in Accordance with the Invention)

Use of a RDS Unit with Non-Optimized Operating Conditions

In Example 2, the same feed A and the same FCC unit as in Example 1 were used. A RDS unit was added downstream of the FCC unit. Thus, this time the feed C produced was treated in a RDS unit the operating conditions of which are given in Table 5 below.

TABLE 5

Operating conditions for RDS unit on the feed C

| | |
|---|---|
| HSV (h$^{-1}$) | 0.3 |
| Pressure (bar) | 180 |
| Temperature (° C.) | 370 |
| HDM catalyst/HDS catalyst, volume ratio | 1/5 |

TABLE 6

Characteristics of 360+ from the effluent obtained

| | |
|---|---|
| Sulphur (wt %) | 0.04 |
| Aromatic carbon (wt %) | 29 |
| Ni + V (ppm) | <1 |
| BMCI | 80 |

The effluent obtained at the outlet from the RDS unit had been considerably desulphurized, which meant that the carbon black was of high purity, but its aromatic carbons content was greatly reduced, which logically has an impact on the carbon black yield from the carbon black unit.

Example 3 (in Accordance with the Invention)

Use of a RDS Unit with Optimized Operating Conditions

In Example 3, the same feed A and the same FCC unit as in Example 2 were used. A RDS unit was added downstream of the FCC unit, as in Example 2.

The feed C produced was treated in a RDS unit under operating conditions which were optimized for a carbon black unit.

The operating conditions for the RDS unit and the yields and characteristics of the effluents produced at the outlet from the RDS unit are indicated in Table 7 below.

TABLE 7

Operating conditions for the RDS unit on the feed C

| | |
|---|---|
| HSV (h$^{-1}$) | 0.5 |
| Pressure (bar) | 80 |
| | 370 |
| HDM catalyst/HDS catalyst, volume ratio | 1/5 |

The characteristics of the effluent from the hydrotreatment unit are given in Table 8 below.

TABLE 8

Characteristics of 360+ from the effluent obtained

| | |
|---|---|
| Sulphur (wt %) | 0.09 |
| Aromatic carbon (wt %) | 54 |
| Ni + V (ppm) | <1 |
| BMCI | 123 |

The effluent obtained at the outlet from the RDS unit had been considerably desulphurized (identical sulphur content to that of Example 2) and its aromatic carbon content remained high (more than 50).

This effluent thus constitutes an excellent feed for the carbon black unit for the production of a high purity carbon black in a very good yield.

Example 4 (in Accordance with the Invention)

Use of the Concatenation RFCC+RDS+BCU for a Hydrotreated Vacuum Residue Type Feed In this example, a different feed for the RFCC unit was used. This feed, denoted feed A', was a hydrotreated residue leaving a RDS type unit.

The characteristics of this feed are given in Table 9 below

TABLE 9

Characteristics of the feed A'

| | |
|---|---|
| Density 15/4 | 0.923 |
| Sulphur (wt %) | 0.30 |
| Conradson carbon (%) | 3.2 |
| Viscosity at 100° C. (Cst) | 18 |
| Ni + V (ppm) | 6 |
| Aromatic carbons (wt %) | 70 |

The feed A' was then sent to RFCC. The Tables 10 and 11 below respectively provide the operating conditions for the RFCC as well as the yields of cuts leaving the RFCC.

TABLE 10

Operating conditions for RFCC

| Catalyst | Silica-alumina |
|---|---|
| C/O | 6.72 |
| ROT (in ° C.) | 525 |
| TRG1 (in ° C.) | 614 |
| TRG2 (in ° C.) | 727 |

TABLE 11

Yields of cuts obtained from the RFCC unit

| Yield Dry gas (wt %) | Yield LPG (wt %) | Yield Naphta-160 (wt %) | Yield Kerosene 180-220 (wt %) | Yield LCO 220-360 (wt %) | Yield Coke (wt %) | Yield HCO + slurry 360+ (wt %) |
|---|---|---|---|---|---|---|
| 3.6 | 16.9 | 39.0 | 10.1 | 14.1 | 7.6 | 8.6 |

Table 12 below gives the characteristics of the 360+ cut from the feed at the outlet from the RFCC. This effluent was then used as the feed for the following RDS unit.

TABLE 12

Characteristics of the 360+ cut

| | |
|---|---|
| Sulphur (wt %) | 0.70 |
| Aromatic carbon (wt %) | 70 |
| Ni + V (ppm) | 5 |
| BMCI | 138 |
| D15/4 (g · cm$^{-3}$) | 1.107 |

The 360+ produced at the outlet from the RFCC was sent to a RDS unit. The operating conditions for the RDS unit as well as the characteristics of the effluents formed are respectively recorded in Tables 13 and 14 below.

TABLE 13

Operating conditions for the RDS unit

| | |
|---|---|
| HSV (h$^{-1}$) | 0.5 |
| Pressure (bar) | 80 |
| Temperature (° C.) | 380 |
| HDM catalyst/HDS catalyst, volume ratio | 1/5 |

TABLE 14

Characteristics of effluent at outlet from RDS

| | |
|---|---|
| Sulphur (wt %) | 0.10 |
| Aromatic carbon (wt %) | 54 |
| Ni + V (ppm) | <1 |
| BMCI | 110 |

The effluent leaving the RDS contained very little sulphur and was used as a feed for the carbon black unit, in order to produce a high purity carbon black in a high yield.

Example 5 (in Accordance with the Invention)

Use of the Concatenation FCC+RDS+BCU for a VGO Type Feed with the Addition of Vacuum Residue at the Inlet to the Hydrotreatment Section In Example 5, the same feed A and the same FCC unit as in Example 2 were used. A RDS unit was added downstream of the FCC unit, as in Example 2.

The feed C produced was mixed with a vacuum residue C' to provide a feed C". The feed C" was then treated in a RDS unit with optimized operating conditions for a carbon black unit.

In this example, C' corresponded to 10% of the feed.

Table 15 below gives the characteristics for the charges C, C' and C".

TABLE 15

Characteristics of feeds C, C', and C''

|  | C | C' | C'' |
|---|---|---|---|
| Density (kg · m$^{-3}$) | 1.117 | 1.003 | 1.104 |
| T50 (in ° C.) | 400 | 600 | 414 |
| Sulphur (% by wt) | 3.7 | 2.56 | 3.59 |
| [Ni + V] (in ppm) | <1 | 259.8 | 26.0 |
| BMCI | 145 | 74 | 137 |

The operating conditions for the RDS unit and the yields and characteristics of the effluents produced at the outlet from the RDS unit are indicated in Tables 16 and 17 below.

TABLE 16

Operating conditions for the RDS unit on the feed C

| HSV (h$^{-1}$) | 0.5 |
|---|---|
| Pressure (bar) | 80 |
| Temperature (° C.) | 380 |
| HDM catalyst/HDS catalyst, volume ratio | 1/5 |

TABLE 17

Characteristics of 360+ from the effluent obtained

| Sulphur (wt %) | 0.13 |
|---|---|
| Aromatic carbon (wt %) | 53 |
| Ni + V (ppm) | 22 |
| BMCI | 127 |

The effluent obtained at the outlet from the RDS unit had been considerably desulphurized (sulphur content close to that of Example 3) and its aromatic carbon content remained high (BMCI>120). This effluent which was produced was thus an excellent feed for the carbon black unit in order to produce a carbon black in a very good yield.

Example 6 (in Accordance with the Invention)

Use of the Concatenation RFCC+RDS+BCU for a Feed of the Hydrotreated Residue Type with the Addition of Vacuum Residue at the Inlet to the Hydrotreatment Section In Example 6, the same feed A' and the same RFCC unit as in Example 4 were used. A RDS unit was added downstream of the RFCC unit, as in Example 2.

The feed C produced was mixed with a vacuum residue C' to provide a feed C''.

The feed C'' was then treated in a RDS unit with optimized operating conditions for a carbon black unit. In this example, C' corresponded to 10% of the feed C''.

The table below gives the characteristics of feeds C, C' and C''.

TABLE 18

Characteristics of feeds C, C', and C''

|  | C | C' | C'' |
|---|---|---|---|
| Density (kg · m$^{-3}$) | 1.107 | 1.003 | 1.096 |
| T50 (in ° C.) | 410 | 600 | 423 |
| Sulphur (% by wt) | 0.7 | 2.56 | 0.89 |
| [Ni + V] (in ppm) | 5 | 25,.8 | 25.5 |
| BMCI | 138 | 74 | 132 |

The operating conditions for the RDS unit and the yields and characteristics of the effluents produced at the outlet from the RDS unit are indicated in Tables 19 and 20 below.

TABLE 19

Operating conditions for the RDS unit on the feed C

| HSV (h$^{-1}$) | 0.5 |
|---|---|
| Pressure (bar) | 80 |
| Temperature (° C.) | 380 |
| HDM catalyst/HDS catalyst, volume ratio | 1/5 |

TABLE 20

Characteristics of 360+ from the effluent obtained

| Sulphur (wt %) | 0.10 |
|---|---|
| Aromatic carbon (wt %) | 55 |
| Ni + V (ppm) | 23 |
| BMCI | 114 |

The effluent obtained at the outlet from the RDS unit had been considerably desulphurized (sulphur content close to that of Example 3) and its aromatic carbon content remained high (BMCI>120). The effluent which was produced was thus an excellent feed for the carbon black unit in order to produce a carbon black in a very good yield.

Example 7 (in Accordance with the Invention)

Use of the Concatenation RFCC+RDS+BCU for a Feed of the Straight Run Residue Type (not Hydrotreated)

In this example, a different feed was used. This feed, denoted feed A'', was a non-hydrotreated straight run residue. These characteristics are given in Table 21 below.

TABLE 21

Characteristics of the feed A''

| Density 15/4 | 0.998 |
|---|---|
| Sulphur (wt %) | 0.5 |
| Conradson carbon (%) | 4.2 |
| Viscosity at 100° C. (Cst) | 25 |
| Ni + V (ppm) | 12 |
| Aromatic carbons (wt %) | 17 |

Tables 22 and 23 below respectively provide the operating conditions for RFCC and the yields of the cuts leaving the RFCC.

TABLE 22

Operating conditions for RFCC

| Catalyst | Silica-alumina |
|---|---|
| C/O | 6.72 |
| ROT (in ° C.) | 525 |
| TRG1 (in ° C.) | 614 |
| TRG2 (in ° C.) | 727 |

TABLE 23

Yields of cuts obtained from the RFCC unit

| Yield Dry gas (wt %) | Yield LPG (wt %) | Yield Naphta-160 (wt %) | Yield Kerosene 180-220 (wt %) | Yield LCO 220-360 (wt %) | Yield Coke (wt %) | Yield HCO + slurry 360+ (wt %) |
|---|---|---|---|---|---|---|
| 3.4 | 16.2 | 38.0 | 10.1 | 15.2 | 8.1 | 9.0 |

Table 24 below gives the characteristics of the 360+ cut of the feed at the outlet from the RFCC. This effluent would thus act as the feed for the following VRDS unit.

TABLE 24

Characteristics of the 360+ cut

| Sulphur (wt %) | 0.90 |
|---|---|
| Aromatic carbon (wt %) | 65 |
| Ni + V (ppm) | 11 |
| BMCI | 142 |
| D15/4 (g · cm$^{-3}$) | 1.107 |

The 360+ cut produced at the outlet from the RFCC was sent to a RDS unit.

The operating conditions for the RDS unit as well as the characteristics of the effluents formed are respectively summarized in Tables 25 and 26 below.

TABLE 25

Operating conditions for the RDS unit

| HSV (h$^{-1}$) | 0.70 |
|---|---|
| Pressure (bar) | 80 |
| Temperature (° C.) | 370 |
| HDM catalyst/HDS catalyst, volume ratio | 1/5 |

TABLE 26

Characteristics of effluent at outlet from RDS

| Sulphur (wt %) | 0.20 |
|---|---|
| Aromatic carbon (wt %) | 54 |
| Ni + V (ppm) | <1 |
| BMCI | 123 |

The effluent leaving the RDS contained very little sulphur and was used as a feed for the carbon black unit, in order to produce a high purity carbon black in a high yield.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of carbon black with a sulphur content of less than 0.3% starting from at least one feed which is a slurry cut obtained from a catalytic cracking unit (FCC or RFCC), the process involving the following steps:
    a step (FILT) for filtering fine solid particles contained in the slurry cut, resulting in a clarified slurry cut, containing less than 300 ppm fine particles;
    a step (RDS) for hydrotreatment of the clarified slurry cut, operating under the following conditions:
    a) a pressure in the range 50 to 200 bars;
    b) a temperature in the range 300° C. to 420° C.;
    c) a HSV in the range 0.1 to 2.5 h$^{-1}$;
    the catalyst used being a succession of at least two distinct hydrotreatment catalysts, and said hydrotreatment step producing an effluent with a BMCI value of more than 110;
    a step (DIST) for distillation of the effluent from the hydrotreatment step, resulting in a "light" portion used as a cut in a fuel pool, and a distillation residue with a sulphur content of less than 0.3%, and having a BMCI of more than 80, and with a density of more than 0.97 g·m$^{-3}$, said distillation residue being introduced into a carbon black unit (CBU),
    a step (CBU) for producing carbon black in the unit, which results in a final product with a specifications in accordance with at least one of the ASTM standards N110, N220, N300, N330, N550, N683, N770, N880, N990.

2. The process for the production of carbon black according to claim 1, in which the two catalysts used in the hydrotreatment unit (RDS) are, in succession (i.e. in the direction of flow of the feed to be treated):
    a catalyst primarily ensuring hydrodemetallization (denoted HDM);
    a catalyst primarily ensuring hydrodesulphurization (denoted HDS), the volumetric ratio of the HDM catalyst to the HDS catalyst being in the range 0.05 to 1.

3. The process for the production of carbon black according to claim 1, in which a feed selected from the following is added to the clarified slurry cut upstream of the hydrotreatment unit (RDS):
    a vacuum residue obtained from a vacuum distillation column,
    an atmospheric residue obtained from an atmospheric distillation column,
    a vacuum distillate obtained from the vacuum distillation column;
    the feed thus produced after mixing having a BMCI of more than 130 before hydrotreatment.

4. The process for the production of carbon black according to claim 1 additionally comprising, a hydrotreated vacuum residue (RSV) feed added to the clarified slurry cut upstream of the hydrotreatment unit (RDS), the RSV feed is hydrotreated in an ebullated bed unit (HYC) under the following operating conditions:
    a pressure in the range 50 to 250 bars;
    a temperature in the range 300° C. to 550° C.;
    an HSV in the range 0.1 to 10 h$^{-1}$;
    the catalysts being selected from catalysts comprising an alumina support and at least one metal from group VIII selected from nickel and cobalt, said element from group VIII being used in association with at least one metal from group VIB selected from molybdenum and tungsten.

5. The process for the production of carbon black according to claim 1, in which a 360° C.+ fraction obtained from coal liquefaction is added to the clarified slurry cut upstream of the hydrotreatment unit (RDS).

6. The process for the production of carbon black according to claim 1, in which a feed known as steam cracking tar is added to the clarified slurry cut upstream of the hydrotreatment unit (RDS).

* * * * *